(12) United States Patent
Hoshio et al.

(10) Patent No.: US 7,511,087 B2
(45) Date of Patent: Mar. 31, 2009

(54) SHEATH COMPOSITION AND CABLE USING THE SAME

(75) Inventors: Takuro Hoshio, Minamiashigara (JP); Hitoshi Okazaki, Minamiashigara (JP); Masayuki Okoshi, Minamiashigara (JP); Michiaki Yasuno, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 563 days.

(21) Appl. No.: 11/205,211

(22) Filed: Aug. 17, 2005

(65) Prior Publication Data

US 2006/0217460 A1 Sep. 28, 2006

(30) Foreign Application Priority Data

Mar. 28, 2005 (JP) ............................... 2005-093055

(51) Int. Cl.
*C08K 9/10* (2006.01)
(52) U.S. Cl. ...................... 523/210; 523/173; 523/212
(58) Field of Classification Search ................. 523/173, 523/205, 210, 212
See application file for complete search history.

(56) References Cited

U.S. PATENT DOCUMENTS 4,671,896 A * 6/1987 Hasegawa et al. ........... 523/210
6,414,059 B1 * 7/2002 Kobayashi et al. .......... 524/101

FOREIGN PATENT DOCUMENTS

| JP | A 2001-302851 | 10/2001 |
| JP | A 2003-34793 | 2/2003 |
| JP | A 2004-168878 | 6/2004 |

OTHER PUBLICATIONS

Okoshi, "Processing and Flameretardancy of Novel organic-inorganic Nanocomposite," Doctoral thesis, Kyoto Institute of Technology, No. kou-305, Feb. 18, 2004, with abstract.

* cited by examiner

*Primary Examiner*—Edward J Cain
(74) *Attorney, Agent, or Firm*—Oliff & Berridge, PLC

(57) ABSTRACT

A sheath composition and a cable using the sheath composition are disclosed. The sheath composition contains a polyolefine resin and flame-retardant particles containing a metal hydrate. The flame-retardant particles are provided with a coating layer on the surfaces thereof and have a volume average particle diameter in a range from 1 to 500 nm.

7 Claims, No Drawings

SHEATH COMPOSITION AND CABLE USING THE SAME

CROSS-REFERENCE TO RELATED APPLICATION

This application claims priority under 35 USC 119 from Japanese Patent Application No. 2005-93055, the disclosure of which is incorporated by reference herein.

BACKGROUND OF THE INVENTION

1. Field of the Invention

The present invention relates to a sheath composition containing a polyolefine resin and flame-retardant particles mixed therein, as well as a cable using the sheath composition.

2. Description of the Related Art

Halogen based flame-retardant agents containing halogen atom have conventionally been added to sheath compositions for cables to add flame resistance thereto. Although halogen based flame-retardant agents exhibit superior flame retardancy, they may generate harmful halogenated dioxins when burned. Therefore, various flame-retardant agents for replacing the halogen based flame-retardant agents have been studied.

Typical examples of flame-retardant agents that replace the halogen based flame-retardant agents are metal hydroxides (metal hydrates) such as magnesium hydroxide, as described in Japanese Patent Application Laid-Open (JP-A) Nos. 2001-302851, 2004-168878 and 2003-34793. However, when cables using sheath compositions containing magnesium hydroxide are left in a highly humid atmosphere, magnesium carbonate may deposit on the surfaces of the cables through a reaction between the magnesium hydroxide and carbon dioxide in the air. This deposition of magnesium carbonate is known as a whitening phenomenon, and may lead to deterioration of flexibility, windability and flame resistance of cables.

Further, since flame retardancy of the metal hydrates is lower than that of the halogen based flame-retardant agents, and the like, it is necessary to blend a large amount of metal hydrate in a resin to obtain necessary flame resistance of the resin. However, if a large amount of metal hydrate is blended in a resin, problems arise such as deterioration of dynamic performances of the resin and lowering of moldability of the resin.

SUMMARY OF THE INVENTION

The present invention provides a sheath composition that has sufficient flame resistance without using a halogen based flame-retardant agent, and has good workability and whitening resistance. The present invention also provides a cable using the sheath composition.

The invention includes the following aspects.

(1) A sheath composition containing: a polyolefine resin; and flame-retardant particles containing a metal hydrate, the flame-retardant particles being provided with a coating layer on the surfaces thereof and having a volume average particle diameter in a range from 1 to 500 nm.

(2) A cable employing a sheath composition containing: a polyolefine resin; and flame-retardant particles containing a metal hydrate, the flame-retardant particles being provided with a coating layer on the surfaces thereof and having a volume average particle diameter in a range from 1 to 500 nm.

DETAILED DESCRIPTION OF THE INVENTION

Hereinafter, a sheath composition of the present invention and a cable using the sheath composition of the invention are described in detail.

The sheath composition of the invention contains a polyolefine resin and flame-retardant particles comprising a metal hydrate, the flame-retardant particles being provided with a coating layer on the surfaces thereof and having a volume average particle diameter in a range from 1 to 500 nm.

As described above, flame-retardant particles such as a metal hydrate, which is conventionally used as a flame-retardant agent, must be blended in a resin in a larger amount than halogen based flame-retardant agents to add the same level of flame resistance to the resin as the halogen based flame-retardant agents do. This significantly degrades physical properties of the resin. In order to prevent degradation of physical properties of the resin, it is necessary to achieve low charging of the flame-retardant agent.

It should be noted that the term "flame-retardant particles" refers to particles that can reduce, in comparison with an ethylene-vinyl acetate copolymer not containing the flame-retardant particles, a maximum heat generation rate (defined in ISO 5660-1) by 25% or more when 5 parts by mass of the flame-retardant particles are contained in 100 parts by mass of the resin.

As one method for achieving the low charging of the flame-retardant agent, the flame-retardant particles are made into fine particles having nanometer-order particle sizes to increase the specific surface area of the particles, i.e., to increase the contact area thereof with a resin. Thus, even a small addition of the flame-retardant particles to a resin can provide flame resistance that is equal to that provided by conventional halogen based flame-retardant agents. Since high flame resistance of the resin can be obtained by small addition of the flame-retardant particles thereto, useful physical properties such as strength and moldability of the resin are not impaired.

The flame-retardant particles containing the metal hydrate serving as a flame-retardant agent has two effects: an effect of decreasing heat by releasing water through thermal decomposition during burning, and an effect of diluting combustion gas generated from the resin during burning. It is known that, usually, these effects of the flame-retardant particles are not sufficiently exhibited unless a large amount of the flame-retardant particles are charged in the resin, however, such a phenomenon applies only in a case of conventional metal hydrate particles having micrometer-order particle sizes.

The present inventors have found that, by making the flame-retardant agent to have a nanometer-order particle size, the effects of decreasing heat and diluting combustion gas generated from the resin during burning can work more delicately and more effectively. Further, it has been found that, as discussed later, by forming a coating layer on the surfaces of the flame-retardant particles, dispersibility of the flame-retardant particles in the resin can be improved.

In addition, flame resistance of the resin can be improved more by using some flame-retardant agents in combination than using only one flame-retardant agent. It is preferred that the sheath composition of the invention further contains a flame-retardant auxiliary selected from the group consisting of boric acid based flame-retardant auxiliaries, ammonia based flame-retardant auxiliaries, inorganic flame-retardant auxiliaries, nitrogen based flame-retardant auxiliaries, organic flame-retardant auxiliaries and colloidal flame-retardant auxiliaries. It should be noted that, in the invention, flame-retardant agents and flame-retardant auxiliaries are distinguished by the blended amount, and those blended to a resin in a higher amount are called "flame-retardant agents", and those blended to the resin in a small amount to further enhance the flame-retardant effect of the main flame-retardant agent are called "flame-retardant auxiliaries".

Char forming compounds used as flame-retardant auxiliaries have two effects: an effect of covering the surface of the resin to block oxygen during burning; and an effect of blocking combustibles emitted from the resin. This flame retarding effect of the char forming compounds is different from that of the metal hydrates.

In the invention, by combining the different effects of the metal hydrate and the char forming compound (flame-retardant auxiliary), the flame retarding effect is further enhanced.

More specifically, when the nanometer-size metal hydrate and the char forming compound are used in combination, superiority of the nanometer-size metal hydrate particles to conventional micrometer-size metal hydrate particles and the inherent effect of the char forming compound are combined, thereby enhancing the flame resistance of the resin more effectively than a combination of conventional micrometer-size metal hydrate particles and the char forming compound. The reason is believed to be a very small distance between the nanometer-size metal hydrate particles and the char forming compound in the resin.

The sheath composition of the invention contains a polyolefine resin. Conventionally, polyvinyl chloride has been used for electric wire sheath compositions. This is because that polyvinyl chloride has good mechanical strength, extrusion workability, flexibility and coloring property. However, it has been found that polyvinyl chloride may generate corrosive gas such as hydrogen chloride and harmful gas such as dioxin when burned. Therefore, in recent years, a resin composition for replacing polyvinyl chloride compositions has been desired. Accordingly, olefine based resins such as polyethylene and polypropylene are used as resin materials that do not contain halogen and have good mechanical strength, extrusion workability, flexibility and coloring property.

Now, components of the sheath composition of the invention are described.

—Flame-Retardant Particles—

The flame-retardant particles containing the metal hydrate of the invention has a volume average particle diameter in a range from 1 to 500 nm. The volume average particle diameter of the flame-retardant particles is preferably in a range from 1 to 200 nm, more preferably in a range from 5 to 200 nm, even more preferably in a range from 10 to 200 nm, and particularly preferably in a range from 10 to 100 nm.

If the volume average particle diameter of the flame-retardant particles is smaller than 1 nm, flame retarding ability thereof is deteriorated. In contrast, if the volume average particle diameter of the flame-retardant particles is larger than 500 nm, properties of the flame-retardant particles are equal to commercially available flame-retardant particles having a volume average particle diameter of 1 μm, and therefore, it is necessary to add a large amount of the flame-retardant particles in the resin to obtain necessary flame resistance of the resin.

In addition, the flame-retardant particles having a volume average particle diameter within the above-defined range are dispersed uniformly in the resin. Further, the flame-retardant particles having a nanometer-size volume average particle diameter can form fine composites and can provide a highly transparent sheath composition.

As the metal hydrate, a hydrate of a metal selected, for example, from Mg, Ca, Al, Fe, Zn, Ba, Cu and Ni can be used. Hydrates of these metals can be easily made into fine particles, are stable as a hydrate, and exhibit superior flame retarding effect because they have good heat absorbing property and good dehydration property when heated. Among the above metal hydrates, hydrates of Mg, Al and Ca are particularly preferred.

The metal hydrate for use in the invention is not particularly limited as long as the metal hydrate retains flame retarding components. Specific examples thereof include: metal hydrates such as aluminum hydroxide, magnesium hydroxide, calcium hydroxide, iron hydroxide, zinc hydroxide, copper hydroxide and nickel hydroxide; and hydrates of calcium aluminate, gypsum dihydrate, zinc borate and barium metaborate. Further, composites of these hydrates are also preferably used. Among them, magnesium hydroxide, aluminum hydroxide and calcium hydroxide are preferred.

In addition, for the metal hydrate, a hydrate of metals (composite metal) containing Mg and one selected from the group consisting of Ca, Al, Fe, Zn, Ba, Cu and Ni can also be used. Such a composite metal containing Mg as an essential metal and one of various metals combined therewith can enhance the flame retarding effect. For example, when Mg and Ni or Fe are combined to form a composite metal, the composite metal provides a function of abstracting hydrogen from hydrocarbon deriving from resinous components that are vaporized during burning, to enhance flame retarding effect and smoke reducing effect of the resin composition. Further, when Mg and Al are combined to form a composite metal, the composite metal enhances flame retarding effect by controlling a water discharging temperature during burning.

In a case where a metal hydrate containing Mg and one selected from the group consisting of Ca, Al, Fe, Zn, Ba, Cu and Ni is used, the metal hydrate is represented by the following general formula (1):

$$MgM_x.(OH)_y \qquad \text{General Formula (1)}$$

wherein M presents at least one metal selected from the group consisting of Ca, Al, Fe, Zn, Ba, Cu and Ni, x presents a real number from 0.1 to 10, and y presents an integer from 2 to 32.

Examples of preferably used $MgM_x$ include $MgAl_x$, $MgCa_x$, $MgZn_x$, $MgFe_x$ and $Mg(Al.Ca)_x$.

The flame-retardant particles for use in the invention have a coating layer formed on their surfaces. It is preferred that the flame-retardant particles have a total light transmittance in a range from 70 to 90% when 0.1 parts by mass of the flame-retardant particles are dispersed in 100 parts by mass of toluene. The total light transmittance of the flame-retardant particles dispersed in toluene can be used as a measure of a surface condition of the flame-retardant particles. The total light transmittance of 70% or more indicates that the surfaces of flame-retardant particles are sufficiently covered with the coating layer. The upper limit of the total light transmittance is set to 90%, since it is practically difficult to make the total light transmittance of the flame-retardant particles exceed 90%.

The total light transmittance is found in the following manner: dispersing 0.1 parts by mass of the flame-retardant particles in 100 parts by mass of toluene through sonication for 10 minutes, putting the dispersion in a 10×10 mm quartz cell, and measuring a transmittance of linear light having a wavelength of 550 nm through the dispersion using a visible light spectral photometer (UV-3600 manufacture by Shimadzu Corporation).

By forming the coating layer on the surfaces of the flame-retardant particles, dispersibility of the flame-retardant particles in the resin can be improved. Further, the coating layer formed on the surfaces of the flame-retardant particles enhances adhesion at interfaces between the polyolefine resin and the flame-retardant particles, so that inherent mechanical properties of the polyolefine resin are not impaired.

In addition, since the surfaces of the flame-retardant particles are sufficiently covered with the coating layer, a reaction between carbon dioxide and metal hydrate is suppressed, thereby suppressing the whitening phenomenon.

The coating layer to be formed on the surfaces of the flame-retardant particles preferably contains an organic compound or polysilicone.

The organic compound for use in the coating layer is not particularly limited; however, one having an organic group that can bond with the flame-retardant particle is preferred. By bonding such an organic group with the flame-retardant particle, a thin organic layer can be uniformly formed on the surface of the flame-retardant particle.

The organic compound preferably has a bonding group at a terminal of the organic group to form a bond with the flame-retardant particle.

Examples of the bonding group include hydroxyl group, phosphate group, phosphonium group, amino group, sulfate group, sulfonic group, carboxyl group, hydrophilic heterocyclic group, polysaccharide group (such as sorbitol, sorbitan, sucrose ester or sorbitan esters residue), polyether group (such as polyoxyalkylene group having 2 to 4 carbon atoms in alkylene, for example, polyoxyethylene or polyoxypropylene group), and hydrolyzable group (such as alkoxy group having 1 to 4 carbon atoms, e.g., methoxy, ethoxy, propoxy, isopropoxy or butoxy group; and halogen atom, e.g., bromine or chlorine atom).

In a case where the bonding group is an anionic group (such as a sulfate group, sulfonic group or carboxyl group), the anionic group may form a salt with various bases. Examples of the base include inorganic bases (alkaline earth metals such as calcium and magnesium; alkali metals such as sodium and potassium; and ammonia), and organic bases (such as amines). In a case where the bonding group is a cationic group (such as amino group), the cationic group may form a salt with an inorganic acid (such as hydrochloric acid or sulfuric acid), or an organic acid (such as acetic acid). The cationic group may form a salt with an anionic group (particularly, carboxyl group or sulfate group). Further, the bonding group may include both of a cationic group and an anionic group.

As described above, preferred examples of the bonding group include ionic groups (anionic group, cationic group) and hydrolyzable groups, and a bond formed between the bonding group and the flame-retardant particle may be an ionic bond or a covalent bond.

Examples of the organic group of the organic compound include groups that act as a hydrophobic group of a surfactant (such as a higher fatty acid residue, a higher alcohol residue, and alkyl-aryl group) and poly amino acid residue.

Specific examples of the higher fatty acid residue include saturated fatty acids having 8 to 30 carbon atoms (preferably saturated fatty acids having 10 to 28 carbon atoms, and more preferably saturated fatty acids having 12 to 26 carbon atoms) such as lauric acid, myristic acid, palmitic acid, arachic acid, behenic acid, lignoceric acid, cerotic acid, caprylic acid, capric acid, daturinic acid, stearic acid, montanic acid, melissic acid; unsaturated fatty acids having 12 to 30 carbon atoms (preferably unsaturated fatty acids having 14 to 28 carbon atoms, and more preferably unsaturated fatty acids having 14 to 26 carbon atoms) such as elaidic acid, linoleic acid, linolenic acid, lindelic acid, oleic acid, gadoleic acid, erucic acid and brassidic acid.

Examples of the higher alcohol residue include higher alcohol residues having 8 to 24 carbon atoms, preferably higher alcohol residues having 10 to 22 carbon atoms, and more preferably higher alcohol residues having 12 to 20 carbon atoms, such as octyl, nonyl, dodecyl, tetradecyl, hexadecyl(cetyl) and octadecyl.

Examples of the alkyl-aryl group include alkyl-aryl groups (preferably an alkyl-aryl group where alkyl has 1 to 20 carbon atoms and aryl has 6 to 18 carbon atoms, more preferably an alkyl-aryl group where alkyl has 6 to 18 carbon atoms and aryl has 6 to 12 carbon atoms, and particularly preferably an alkyl-phenyl group where alkyl has 6 to 16 carbon atoms) such as hexyl phenyl, octylphenyl, nonylphenyl, decylphenyl, dodecylphenyl, isopropylphenyl, butylphenyl, amyl phenyl and tetradecyl phenyl.

These hydrophobic groups may be substituted with various substituents (for example, an alkyl group having 1 to 4 carbon atoms).

The polysilicone is not particularly specified as long as it has a siloxane bond; however, it is preferable to use a polymer of a cyclic organosiloxane compound represented by the following general formulae (2):

General Formulae (2)

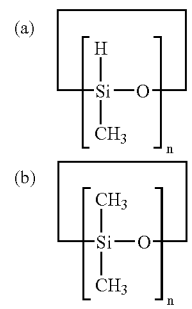

General Formulae (2)

In the above formulae, n presents an integer from 3 to 8. Smaller the number represented by n, lower the boiling point, resulting in a greater quantity of the polysilicone volatilizing and adsorbing to the flame-retardant particles. The number represented by n greater than 7 is not preferable, because such a polysilicone is less volatile, resulting in insufficient coating. Particularly preferable n is 4, 5 or 6, because the three-dimensional characteristic of the polysilicone facilitates polymerization.

In the invention, one of the cyclic organosiloxane compounds (a) and (b) represented by general formulae (2) can be used, or both of them can be used in combination. A degree of polymerization (a number of repeat units) of the polymer is preferably in a range from 10 to 1000, and more preferably in a range from 10 to 100. Further, the polymer and the organic compound may used in combination in the coating layer.

Using the polysilicone having low surface energy such as described above as the coating layer, the polyolefine resin having the flame-retardant particles mixed therein becomes less likely to plasticize.

If the sheath composition is burned, the polysilicone layer at the surface of the flame-retardant particles forms a thermal barrier layer. With the polysilicone layer formed on the surfaces of the particles, moisture released from the metal hydrate particles makes the thermal barrier layer foam, thereby improving adiathermancy of the thermal barrier layer and enhancing the flame retarding effect.

A coating amount of the organic compound on the surface of the flame-retardant particles of the invention is preferably in a range from 1 to 200% by mass, more preferably in a range from 20 to 100% by mass, and even more preferably in a range from 30 to 80% by mass with respect to the metal hydrate. If the coating amount is less than 1% by mass, aggregates may generate in the polyolefine resin and dispersion of the flame-retardant particles in the polyolefine resin may be non-uniform. In contrast, if the coating amount exceeds 200% by mass, the polyolefine resin having the flame-retardant particles dispersed therein may plasticize.

A coating amount of the polysilicone on the surface of the flame-retardant particles is preferably in a range from 20 to 200% by mass, and more preferably in a range from 20 to 80% by mass with respect to the metal hydrate. If the coating amount is less than 20% by mass, aggregates may generate in the polyolefine resin and dispersion of the flame-retardant particles in the polyolefine resin may be non-uniform. In contrast, if the coating amount exceeds 200% by mass, the polyolefine resin having the flame-retardant particles dispersed therein may plasticize.

It should be noted that uniformity of the coating layer can be checked by observing the flame-retardant particles with a transmission electron microscope.

A degree of dispersion (dispersion degree) of the flame-retardant particles in the invention is preferably in a range from 0.1 to 3.0, more preferably in a range from 0.1 to 1.0, and particularly preferably in a range from 0.1 to 0.8.

A smaller degree of dispersion indicates that a particle size distribution of the flame-retardant particles is narrower, that is, uniformity of sizes of the particles is higher. When flame-retardant particles having a degree of dispersion within the above-mentioned range are dispersed in a resin, flame retardancy and mechanical characteristics of the resin become uniform.

The volume average particle diameter and the degree of dispersion are measured with a laser doppler heterodyne type particle size analyzer (MICROTRAC-UPA150 manufactured by UPA Nikkiso Co., Ltd.) (this is the same throughout the specification). Specifically, based on a measured particle size distribution, a cumulative distribution is plotted from a smaller particle size side with respect to volume, and a particle size where the accumulation is 50% is taken as a volume average particle diameter. When a particle size distribution is plotted with respect to mass, and a particle size where the accumulation is 90% from the smaller particle size side is represented by $D_{90}$, and a particle size where the accumulation is 10% is represented by $D_{10}$, the degree of dispersion is defined by the following equation (this measuring method is the same throughout the specification):

Degree of dispersion=log $(D_{90}/D_{10})$

A method for producing the surface-coated flame-retardant particles is not particularly limited as long as the method can produce surface-coated flame-retardant particles that satisfy the above-described constitution and characteristics. For example: a method where metal hydrate particles are dispersed in an aqueous solution containing a metal salt of an organic compound and a dispersant dissolved therein to form a layer of the organic compound on the surfaces of the metal hydrate particles; a method where an evaporating material of an organosiloxane compound is made to act on the surfaces of the metal hydrate particles to form a polysilicone compound layer thereon; and a method where a metal salt of an alkyl acid is dispersed in an organic solvent to form a reverse micelle, and metal ion is oxidized into a metal oxide to form surface-coated particles are given. These methods are described in detail in Japanese Patent Application Nos. 2005-49009, 2005-49010 and 2005-49011.

An amount of the flame-retardant particles to be blended in the sheath composition of the invention is preferably in a range from 0.1 to 99% by mass, and more preferably in a range from 1 to 50% by mass.

—Polyolefine Resin—

The type of the polyolefine resin for use in the invention is not particularly limited as long as it is a polymer having a repeat unit of ethylene chain as the main skeleton. Examples of the polyolefine resin include: polyethylenes such as high density polyethylene, medium density polyethylene and low density polyethylene; copolymers of ethylene with α-olefines having 3 to 12 carbon atoms such as propylene, 1-butene, 1-pentene, 1-hexene, 4-methyl-1-pentene, 1-octene and 1-decene; polypropylene; copolymers of propylene with α-olefines having 2 to 12 carbon atoms such as ethylene, 1-butene, 1-pentene, 1-hexene, 4-methyl-1-pentene, 1-octene and 1-decene; ethylene-propylene copolymer rubber; ethylene-propylene-diene copolymer rubber; copolymers of ethylene with vinyl type monomers such as vinyl acetate, ethyl acrylate, methacrylic acid, ethyl methacrylate, maleic acid and maleic anhydride; copolymers obtained by modifying a polyethylene or an ethylene-α-olefine copolymer with unsaturated carboxylic acids such as acrylic acid and maleic acid or derivatives thereof; and combinations of these polyolefine resins. Among them, polyethylene, ethylene-vinyl acetate copolymer, ethylene-ethyl acrylate copolymer and polypropylene are particularly preferred.

A content of the polyolefine resin in the sheath composition of the invention is preferably in a range from 0.1 to 99% by mass, more preferably in a range from 1 to 99% by mass, and particularly preferably in a range from 10 to 99% by mass.

<Flame-Retardant Auxiliary>

A flame-retardant auxiliary for use in the invention is preferably one selected from the group consisting of boric acid based flame-retardant auxiliaries, ammonia based flame-retardant auxiliaries, inorganic flame-retardant auxiliaries, nitrogen based flame-retardant auxiliaries, organic flame-retardant auxiliaries, and colloidal flame-retardant auxiliaries.

Examples of boric acid based flame-retardant auxiliaries include compounds containing boric acid such as zinc borate hydrate, barium metaborate and borax.

Examples of ammonia based flame-retardant auxiliaries include ammonia compounds such as ammonium sulfate.

Examples of inorganic flame-retardant auxiliaries include: iron oxide based burning catalysts such as ferrocene; compounds containing titanium such as titanium oxide; guanidine based compounds such as guanidine sulfamate; zirconium based compounds; molybdenum based compounds; tin based compounds; carbonate compounds such as potassium carbonate; metal hydrates such as aluminum hydroxide and magnesium hydroxide; and modified products thereof.

Examples of nitrogen based flame-retardant auxiliaries include cyanurate compounds having a triazine ring.

Examples of organic flame-retardant auxiliaries include chlorendic anhydride, phthalic anhydride, compounds containing bisphenol A, glycidyl compounds such as glycidyl ether, polyalcohols such as diethylene glycol and pentaerythritol, modified carbamide, silicone oil, and silicone compounds such as organosiloxane.

Examples of colloidal flame-retardant auxiliaries include colloids of flame retarding compounds such as conventionally used metal hydrates having flame retarding property such as aluminum hydroxide, magnesium hydroxide and calcium hydroxide, hydrates of calcium aluminate, gypsum dihydrate, zinc borate, barium metaborate, borax and kaolin clay, nitric acid compounds such as sodium nitrate, and molybdenum compounds, zirconium compounds, antimony compounds, Dawsonite and phlogopite.

Many of the above-mentioned various flame-retardant auxiliaries are water-soluble or hydrophilic, and they may be used singly or in combination thereof. From the standpoint of obtaining excellent flame retarding effects with a relatively small amount of the flame-retardant auxiliary, the flame-retardant auxiliary for use in the invention is preferably at least one selected from the group consisting of the boric acid based flame-retardant auxiliaries, the inorganic flame-retardant auxiliaries, the nitrogen based flame-retardant auxiliaries, the organic flame-retardant auxiliaries and the colloidal flame-retardant auxiliaries. Among them, the boric acid based flame-retardant auxiliaries are more preferable.

A content of the flame-retardant auxiliary in the sheath composition of the invention is preferably in a range from 0.1 to 50% by mass, and more preferably in a range from 1 to 20% by mass.

—Other Components—

It is preferable that the sheath composition of the invention further contains at least one selected from the group consisting of a filler, a mould releasing agent and a colorant.

Specific examples of the filler include silica powder such as fused silica, alumina, talc, calcium carbonate, clay and mica. A filler that is surface-treated with a surface treating agent such as a coupling agent can also be used. By adding the filler to the sheath composition of the invention, effects such as reduction of hygroscopic property, reduction of coefficient of linear expansion, enhancement of mechanical strength and achievement of high thermal conduction can be obtained.

Specific examples of the mould releasing agent include natural waxes, synthetic waxes, metal oxides of straight chain aliphatic acids, acid amides, esters and paraffins. By adding the mould releasing agent to the sheath composition of the invention, the sheath composition can be provided with a soil resistant effect.

Specific examples of the colorant include carbon black and red iron oxide. By adding the colorant to the sheath composition of the invention, the sheath composition can be prevented from deteriorating over time due to direct sunlight and the like.

The sheath composition of the invention may further contain other components such as an antioxidant, an antiozonant, an ultraviolet absorbing agent and a light stabilizer, as required.

The sheath composition of the invention can be obtained by mixing the polyolefine resin and the flame-retardant particles, as well as those used as necessary such as the flame-retardant auxiliary, the filler, the mould releasing agent and the colorant, and kneading them in a kneading machine.

The type of the kneading machine is not particularly limited. From a view point of obtaining high dispersibility, preferable methods are: a method where the flame-retardant particles are dispersed by a shear stress and repeated positional changes effected with a three-roll or two-roll kneader; and a method where the flame-retardant particles are dispersed by a collision force against the wall of a disperser and a shearing force effected with a kneader, a Banbury mixer, an Intermix, an uniaxial extruder and a biaxial extruder.

A temperature for kneading varies depending on types and amounts of the polyolefine resin, the flame-retardant particles, and the like to be used, and a preferable range thereof is from 50 to 450° C., and a more preferable range thereof is from 60 to 380° C.

A cable of the invention employs the sheath composition of the invention. The cable can be formed by extruding the sheath composition on an optical fiber or a conductor such as copper, a copper-coated aluminum wire or a copper-coated steel wire so that the sheath composition covers the optical fiber or the conductor. The cable of the invention is usable as cables for internal and external wiring of electric and electronic machines. A thickness of the sheath composition covering the cable of the invention is usually in a range from about 0.5 to 1.8 mm, however, this range is not intended to limit the invention.

Further, by performing electron beam crosslinking of the sheath composition employed in the cable of the invention, heat resistance and mechanical properties of the cable can be enhanced.

The cable of the invention employing the sheath composition of the invention has good flame resistance, and does not generate harmful halogenated dioxins when burned. In addition, since the cable of the invention is less liable to have the whitening phenomenon, the cable of the invention can maintain good flame resistance, flexibility and windability for a long time.

The flame-retardant particles contained in the sheath composition of the invention preferably have a total light transmittance in a range from 70 to 90% when 0.1 parts by mass of the flame-retardant particles are dispersed in 100 parts by mass of toluene.

The metal hydrate for use in the sheath composition of the invention is preferably a hydrate of metals containing Mg and one selected from the group consisting of Ca, Al, Fe, Zn, Ba, Cu and Ni.

The metal hydrate for use in the sheath composition of the invention is preferably a hydrate of a metal selected from the group consisting of Mg, Ca, Al, Fe, Zn, Ba, Cu and Ni.

The coating layer formed on the surfaces of the flame-retardant particles preferably contains an organic compound or polysilicone.

It is preferable that the sheath composition further contains a flame-retardant auxiliary selected from the group consisting of boric acid based flame-retardant auxiliaries, ammonia based flame-retardant auxiliaries, inorganic flame-retardant auxiliaries, nitrogen based flame-retardant auxiliaries, organic flame-retardant auxiliaries and colloidal flame-retardant auxiliaries.

EXAMPLES

Hereinafter, the present invention is described in more detail with reference to Examples; however, these Examples are not intended to limit the invention.

—Preparation of Flame-Retardant Particles—

(Preparation of Flame-Retardant Particles 1 (Coated with a Silicone Compound))

100 parts by mass of magnesium hydroxide particles having a volume average particle diameter of 495 nm as the flame-retardant particles, and 200 parts by mass of octamethylcyclotetrasiloxane as the cyclic organosiloxane compound are weighed in separate glass vessels. These glass vessels are placed in a desiccator that is sealable and pressure-reducible. Then, an internal pressure of the desiccator is reduced to 80 mmHg with a vacuum pump, and the desiccator is sealed up.

Subsequently, the desiccator is left for 12 hours at an environment of 60° C. for surface treatment. Thereafter, flame-retardant particles 1 (coated with a silicone compound), thus surface-treated, are taken out from the glass vessel.

The resulting flame-retardant particles 1 (coated with a silicone compound) have a volume average particle diameter of 495 nm and a dispersion degree (degree of dispersion) of 0.5. Further, the flame-retardant particles 1 (coated with a silicone compound) are precisely weighed and a surface coating amount thereof is calculated to be 20% by mass. The flame-retardant particles 1 (coated with a silicone compound) are observed with a transmission electron microscope (FEI Company TecnaiG2) and found to be uniformly coated.

Magnesium hydroxide particles having a volume average particle diameter of 495 nm (without a coating) are taken as flame-retardant particles 1 (without a coating).

(Preparation of Flame-Retardant Particles 1 (Coated with a Long Chain Carboxylic Acid))

1,000 ml of ion-exchanged water is placed in a 2,000 ml separable flask, and 100 parts by mass of sodium isostearate as the metal salt of an organic compound (9.1% by mass) and 5 parts by mass of polypropyl cellulose as the dispersant are added thereto and are heated to be dissolved. After the flask is cooled off to room temperature, 50 parts by mass (dispersion concentration: 45.2% by mass) of composite particles of magnesium hydroxide/aluminum hydroxide (MgAlx.(OH)y, where x is 2 and y is 8) having a volume average particle diameter of 495 nm as the flame-retardant particles are added thereto, and are subjected to agitation/ultrasonication to prepare a dispersion.

Subsequently, 200 parts by mass of 2% by mass hydrochloric acid is added dropwise at a rate of 200 ml/hour while the dispersion is agitated and ultrasonicated. After the addition of hydrochloric acid has been completed, the dispersion is converted into a magnesium hydroxide/aluminum hydroxide sol. Then, the resulting magnesium hydroxide/aluminum hydroxide sol is dissolved in toluene, and the sol is precipitated again with a centrifugal separator. The precipitate is dried in a vacuum dryer to obtain flame-retardant particles 1 (coated with a long chain carboxylic acid).

The resulting flame-retardant particles 1 (coated with a long chain carboxylic acid) have a volume average particle diameter of 495 nm and a dispersion degree of 0.5. Further, the flame-retardant particles 1 (coated with a long chain carboxylic acid) are precisely weighed and a surface coating amount thereof is calculated to be 30% by mass. The flame-retardant particles 1 (coated with a long chain carboxylic acid) are observed with a transmission electron microscope (FEI Company TecnaiG2) and found to be uniformly coated.

(Preparation of Flame-Retardant Particles 1 (Coated with a Silane Coupling Agent))

100 parts by mass of magnesium hydroxide particles having a volume average particle diameter of 495 nm as the flame-retardant particles are added to 2000 parts by mass of ion exchanged water, to prepare a suspended aqueous solution of magnesium hydroxide. Then, 200 parts by mass of aqueous 5% by mass solution of vinyl trimethoxy silane having a pH in a range from 3.5 to 4.0 adjusted with acetic acid is added to the suspended aqueous solution of magnesium hydroxide while being stirred, and after 30 minutes of stirring, the suspended aqueous solution is dried through a spray drier.

The resulting flame-retardant particles 1 (coated with a silane coupling agent) have a volume average particle diameter of 495 nm and a dispersion degree of 0.5. Further, the flame-retardant particles 1 (coated with a silane coupling agent) are precisely weighed and a surface coating amount thereof is calculated to be 0.92% by mass. The flame-retardant particles 1 (coated with a silane coupling agent) are observed with a transmission electron microscope (FEI Company TecnaiG2) and found to have uncoated portions.

(Preparation of Flame-Retardant Particles 2)

Flame-retardant particles 2 are obtained in the same manner as the flame-retardant particles 1 (coated with a silicone compound), except that 200 parts by mass of magnesium hydroxide particles having a volume average particle diameter of 80 nm are used as the flame-retardant particles.

The resulting flame-retardant particles 2 have a volume average particle diameter of 80 nm and a dispersion degree of 0.5. Further, the flame-retardant particles 2 are precisely weighed and a surface coating amount thereof is calculated to be 50% by mass. The flame-retardant particles 2 are observed with a transmission electron microscope (FEI Company TecnaiG2) and found to be uniformly coated.

(Preparation of Flame-Retardant Particles 3)

Flame-retardant particles 3 are obtained in the same manner as the flame-retardant particles 1 (coated with a silicone compound), except that 400 parts by mass of magnesium hydroxide particles having a volume average particle diameter of 10 nm are used as the flame-retardant particles.

The resulting flame-retardant particles 3 have a volume average particle diameter of 10 nm and a dispersion degree of 0.5. Further, the flame-retardant particles 3 are precisely weighed and a surface coating amount thereof is calculated to be 80% by mass. The flame-retardant particles 3 are observed with a transmission electron microscope (FEI Company TecnaiG2) and found to be uniformly coated.

(Preparation of Flame-Retardant Particles 4)

Flame-retardant particles 4 are obtained in the same manner as the flame-retardant particles 1 (coated with a silicone compound), except that 200 parts by mass of magnesium hydroxide particles having a volume average particle diameter of 800 nm are used as the flame-retardant particles.

The resulting flame-retardant particles 4 have a volume average particle diameter of 800 nm and a dispersion degree of 5.0. Further, the flame-retardant particles 4 are precisely weighed and a surface coating amount thereof is calculated to be 15% by mass. The flame-retardant particles 4 are observed with a transmission electron microscope (FEI Company TecnaiG2) and found to have uncoated portions.

(Preparation of Flame-Retardant Particles 5)

Flame-retardant particles 5 are obtained in the same manner as the flame-retardant particles 1 (coated with a silicone compound), except that 200 parts by mass of magnesium hydroxide particles having a volume average particle diameter of 2000 nm are used as the flame-retardant particles.

The resulting flame-retardant particles 5 have a volume average particle diameter of 2000 nm and a dispersion degree of 6.0. Further, the flame-retardant particles 5 are precisely weighed and a surface coating amount thereof is calculated to be 10% by mass. The flame-retardant particles 5 are observed with a transmission electron microscope (FEI Company TecnaiG2) and found to have uncoated portions.

Example (Ex.) 1

100 parts by mass of ethylene-vinyl acetate copolymer (EVA) as the polyolefine resin and 10 parts by mass of the flame-retardant particles 1 (coated with a silicone compound) are mixed and kneaded with a steamroll to obtain a sheath composition. The resulting sheath composition is evaluated for flame resistance, workability and whitening resistance according to the methods described below. The results are shown in Table 1 along with total light transmittance values of the flame-retardant particles. A unit for numerical values in Table 1 is "part by mass" unless otherwise specified.

<Flame Resistance>

The sheath composition is extruded on a copper conductor having an outer diameter of 1.6 mm so that the sheath composition having a thickness of 0.8 mm covers the conductor to produce a cable. Then, a 60-degree-inclined burning test according to JIS Standard C3005 is conducted on the cable, and flame resistance thereof is evaluated according to the following criteria:

A: when the cable self-extinguishes within 30 seconds from when it caught fire; and C: when the cable self-extinguishes after 30 seconds or more from when it caught fire or does not self-extinguish.

<Workability>

The sheath composition is extruded on a copper conductor having an outer diameter of 1.6 mm so that the sheath composition having a thickness of 0.8 mm covers the conductor to produce a cable. Then, condition of sheathing on the cable is visually observed, and whether the cable is fully sheathed is evaluated according to the following criteria:

A: when the cable is fully sheathed; and

C: when the cable has portions without sheathing.

<Whitening Resistance>

Carbon dioxide gas is flowed at a flow rate of 200 ml/minute in a desiccator with a humidity of 90% or more, and test pieces of the sheath composition (with a thickness of 1 mm, width of 40 mm and a length of 70 mm) are left in the desiccator for 72 hours. Changes of the test pieces over time are visually observed, and whitening resistance of each test piece is evaluated according to the following criteria:

A: when the test piece has no whitened portion; and

C: when the test piece has a whitened portion.

Examples 2 to 5 and Comparative Examples (Comp. Ex.) 1 to 4

Sheath compositions of Examples 2 to 5 and Comparative Examples 1 to 4 are obtained in the same manner as in Example 1, except that the types and amounts of the polyolefine resin, the flame-retardant particles and the flame-retardant auxiliary are varied as shown in Table 1. The resulting sheath compositions are evaluated in the same manner as in Example 1. The results are shown in Table 1. It should be noted that, in Example 5, zinc borate is used as the flame-retardant auxiliary.

TABLE 1

| Contents of composition | Coating layer | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|
| EVA | | 100 | 100 | 100 | 100 | 100 | 100 | 100 | 100 | 100 |
| Flame-retardant particles 1 (495 nm) | Silicone compound | 10 | | | | 5 | | | | |
| Flame-retardant particles 1 (495 nm) | Long-chain carboxylic acid | | 10 | | | | | | | |
| Flame-retardant particles 1 (495 nm) | None | | | | | | 10 | | | |
| Flame-retardant particles 1 (495 nm) | Silane coupling agent | | | | | | | | 10 | |
| Flame-retardant particles 2 (80 nm) | Silicone compound | | | 10 | | | | | | |
| Flame-retardant particles 3 (10 nm) | Silicone compound | | | | 10 | | | | | |
| Flame-retardant particles 4 (800 nm) | Silicone compound | | | | | | | | 10 | |
| Flame-retardant particles 5 (2000 nm) | Silicone compound | | | | | | | | | 10 |
| Flame-retardant auxiliary | | | | | | 5 | | | | |
| Total light transmittance (%) | | 78 | 80 | 88 | 80 | 77 | 5 | 49 | 58 | 23 |
| Flame resistance | | A | A | A | A | A | C | C | A | C |
| Workability | | A | A | A | A | A | C | C | C | A |
| Whitening resistance | | A | A | A | A | A | C | C | A | A |

As can be seen from Table 1, the invention can provide a sheath composition that has sufficient flame resistance without containing a halogen based flame-retardant agent, and has good workability and whitening resistance, as well as a cable using the sheath composition.

What is claimed is:

1. A sheath composition comprising:
   a polyolefine resin; and
   flame-retardant particles containing a metal hydrate, the flame-retardant particles being provided with a coating layer on the surfaces thereof and having a volume average particle diameter in a range from 1 to 200 nm.

2. The sheath composition of claim 1, wherein the flame-retardant particles have a total light transmittance in a range from 70 to 90% when 0.1 parts by mass of the flame-retardant particles are dispersed in 100 parts by mass of toluene.

3. The sheath composition of claim 1, wherein the metal hydrate is a hydrate of metals comprising Mg and one selected from the group consisting of Ca, Al, Fe, Zn, Ba, Cu and Ni.

4. The sheath composition of claim 1, wherein the metal hydrate is a hydrate of a metal selected from the group consisting of Mg, Ca, Al, Fe, Zn, Ba, Cu and Ni.

5. The sheath composition of claim 1, wherein the coating layer comprises an organic compound or a polysilicone.

6. The sheath composition of claim 1, further comprising a flame-retardant auxiliary selected from the group consisting of boric acid based flame-retardant auxiliaries, ammonia based flame-retardant auxiliaries, inorganic flame-retardant auxiliaries, nitrogen based flame-retardant auxiliaries, organic flame-retardant auxiliaries and colloidal flame-retardant auxiliaries.

7. A cable comprising the sheath composition of claim 1.

* * * * *